United States Patent Office 3,506,119
Patented Apr. 14, 1970

3,506,119
**METHOD AND APPARATUS FOR CLASSIFY-
ING BY GRAVITY A GRANULAR MATERIAL
MIXTURE**
Hans Rumpf, 12 Hansjacobstrasse, 75 Karlsruhe, Germany; Kurt Leschonski, Forchheim, and Manfred Weilbacher, Karlsruhe, Germany; said Leschonski and said Weilbacher assignors to said Rumpf
Filed Feb. 20, 1968, Ser. No. 706,868
Claims priority, application Germany, Feb. 21, 1967,
R 45,341
Int. Cl. B03b 3/00
U.S. Cl. 209—139                       12 Claims

ABSTRACT OF THE DISCLOSURE

Method of classifying by gravity for the analytic or preparatory separation of a granular material mixture at a grain size split below about 0.15 mm. includes passing a flowing medium upwardly through an inlet, at uniform velocity across the flow cross section of the inlet, which is located in a substantially vertically disposed flow tube containing, in a lower portion thereof, a quantity of the granular mixture so that a finer component of the granular mixture is entrained by the flowing medium and is separated from a coarser component of the granular mixture remaining in the lower portion of the flow tube, and drawing off the flow medium together with the entrained finer component at accelerated speed above the flow tube.

Figure 1:
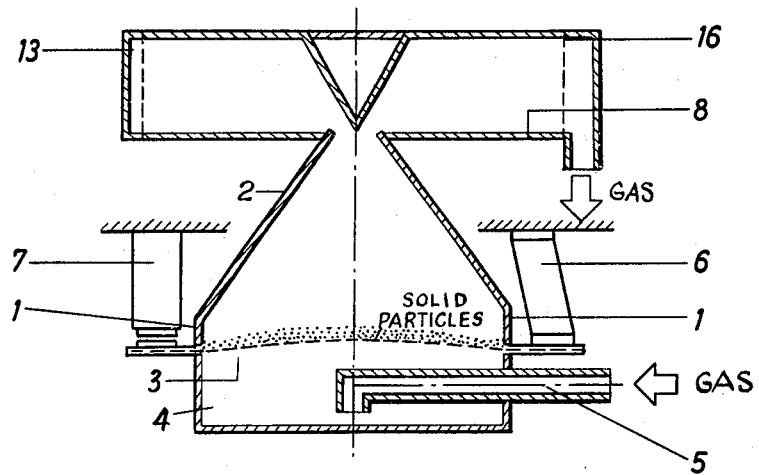

Apparatus for carrying out the foregoing method wherein the flow tube has a constant cross section, is relatively short and has a lower inlet and an upper outlet for the flowing medium, and including a conical tube connected to the flow tube and narrowing away therefrom, and a porous base extending over the cross section of the flow tube at the inlet thereof.

Our invention relates to the art of analytical or preparatory classifying by gravity of granular solids for limits of separation or grain-size splits below about 0.15 mm., whereby material located in a lower portion of a substantially vertical flow tube is separated, by a flowing medium passing upwardly through the flow tube, into a fine component entrained with the flowing medium and a coarse component remaining in the lower portion of the flow tube.

For the analysis of grain size distribution (grain analysis) of dispersed solids, there are known analyzing gravity or free settling separators or classifiers such as according to Gonell, Bauart Chemisches Labor for Tonindustrie (Construction Chemical Laboratory for the Clay Industry), wherein air is used as the flowing or separating medium, and so-called elutriating or decanting apparatus which is operated with a liquid as separating medium. With these classifiers, so-called standpipe or columnar separators or standpipe or columnar decanting apparatuses, the classifying or separation according to grain size (strictly speaking according to the speed at which the individual grains settle in the flowing medium) takes place in an upwardly directed laminar flow through the column, i.e. in a direction opposite to gravity. In order for a uniform laminar flow through the column with a developed flow profile to be formed these apparatuses have relatively long flow pipes or columns with lengths that are at least five to ten times the diameter thereof. The maximal flow velocity in the middle of the pipe is twice as great as the mean velocity calculated from the flowing medium throughput volume and the flow pipe cross section. At the lower pipe end, generally a conical constriction is provided, which communicates, for example, with a suitably constructed vessel that contains the material to be separated and into which the flowing medium is introduced with comparatively high velocity.

The ascending, fluid separating medium at the lower end of the separating column or standpipe, i.e. at the transition of the conical to the cylindrical portion thereof, has a velocity distribution over the standpipe cross section. The particular velocity distribution depends upon the apex or aperture angle of the cone and upon the flow conditions established in the cone. A result thereof is that very different separating conditions are present over the separating pipe cross section. Furthermore, these conditions change over the pipe length, because the comparatively uniform flow profile continuously changes at the lower end of the separating pipe until disturbances occur. The cause for the changing separating conditions is the continuously broadening boundary layer in the flow direction. The flow velocities of the boundary layer zone become lower whereas those in the vicinity of the pipe axis increase. Increasing flow velocities effect a more rapid carrying off or discharge of the entrained fine material whereas decreasing flow velocities result in the resettling of the entrained fine material. This resettling of the fine material particles in the marginal or boundary zones is a great disadvantage of the heretofore known constructions.

The local flow velocity directed opposite to gravity of each individual particle is a determining factor in the separation that is sought to be carried out. If the local flow velocity is greater than the settling velocity of the individual particle in the static separating or fluid medium, the particle is then entrained upwardly with a discharge velocity that is equal to the difference of both the local flow velocity and the settling velocity of the particle. The closer the settling velocity approaches the local flow velocity, the greater is the discharge velocity of the particle. In the extreme case or limit for the separating grain size, which is simply defined as the grain size, when the settling velocity and local flow velocity are equal and opposite, the resulting velocity of the particle is zero. Particles that are only slightly smaller than the separating grain size therefore require relatively long periods of time for resettling down through a relatively short distance. Consequently, the relatively long separating columns or standpipes conventionally employed heretofore for separating such particles result in an excessive time consumption for effecting the separation. If the classifying operation is carried out over a long experimental period, each particle has a statistical chance of coming at some time within range of the maximal flow velocity within the separating column so that, after a long period of time, this determines the separating grain size for the material to be separated. This also causes a corresponding increase in time required for performing the separation. Heretofore, the separating grain size or split for free settling or gravity classifiers has been calculated from the flow velocity averaged over the standpipe cross section, which has been determined from the flowing medium volume throughput or flow rate and the separating column or pipe cross section. However, because a velocity profile actually exists, this is always lower than the velocity which is decisive for the separation. From the foregoing it follows that the velocity which determines the separation in the separating column is not calculable, however, because it depends upon the respective flow conditions established in the lower conical end of the separating column or standpipe. In addition, the separating limit or split of grain size ranges effected in the classifier is a function of time because it determines the chance of all the particles being subjected to the maximal flow velocity which establishes the separating limit of split of the grain size ranges being classified. This chance depends additionally on the quantity of the material to be separated and the grain-size distribution thereof.

The heretofore known classifying apparatuses have two important disadvantages, one of which is namely that the separating limit or split of grain size ranges is unable to be calculated beforehand with sufficient accuracy, and the second of which is that very lengthy experiment periods are required in order to attain highly selective classifications. The first-mentioned disadvantage is especially serious because the separating limit or split in grain-size ranges must be calculable from the experimental conditions appertainable to the determination. The lengthy experimental periods are not nearly as significant since they only signify at worst a rather poor utilization of the classifying equipment.

It is accordingly an object of our invention to provide method and apparatus for gravity or free-settling classifying of granular solids which avoid the aforementioned disadvantages of the heretofore known methods and apparatuses of this general type.

More particularly, it is an object of our invention to provide such method and apparatus which will permit accurate precalculation of the separating limit or split in the grain-size ranges being classified.

A further object of our invention is to provide such method and apparatus as will reduce the experimental time necessary for achieving highly selective classifications.

With the foregoing and other objects in view, we provide the improvement in conventional gravity or free-settling classifying methods which comprises passing a separating fluid medium through a pipe inlet at uniform velocity (rectangular profile) over the flow cross section so as to entrain finer particles from a supply of particulate solids to be classified which are disposed in a separating zone adjacent the pipe inlet, and drawing off or discharging the separating medium together wtih the entrained finer particles at accelerated speed above the separating zone. The rectangular velocity profile in the inlet cross section of the pipe or column during undisturbed forward flow transforms with increasing distance along the column from the inlet into a parabolic laminar profile or into the greatly flattened turbulent profile [see for example Schlichting, Grenzschichttheorie (Boundary Layer Theory), publisher: Braun, Karlsruhe, Germany, 1951, pages 65, 205 and 362].

A uniform pipe-inlet flow into the separating column or standpipe is constructively accomplished most simply by providing a porous base or plate across the inlet cross section of tee pipe. Tne porous base is advantageously a filtering means such as a paper or plastic fiber filter, a filter plate or the like, or a fine mesh screen. A great pressure drop occurring when the separating fluid medium passes through the finely porous base results in a uniform flow-through and renders the formation of the rectangular profile independent of the flow through the inlet cross section. The aforementioned accelerated discharge or withdrawal of the separating fluid medium together with the entrained fine particulate solid out of the separating zone occurs when the flow cross section above the separating pipe is steadily reduced in size, for example by employing a hollow cone open at the top for a conical upwardly narrowing pipe.

In order to attain highly selectively or sharply separated classifications, the length of the separating pipe which determines the height of the separating zone must be greatly shortened. For a very carefully adjusted pipe-inlet flow it is sufficient to provide a separating zone having a height of a few millimeters which, however, for reasons of manufacture and in order to avoid reactive effects on the uniform velocity distribution in the separating zone due to installations or inserts required at the upper end of the separating column or standpipe, is slightly increased in height. It is sufficient, however, to provide a separating zone generally having a height of several centimeters. A proportion of length to diameter of the separating column or standpipe that is smaller than 1 is therefore to be selected.

The construction and operation of the classifier of our invention is not limited to relatively low flow speeds, i.e. to laminar pipe flows, but rather, higher speeds, i.e. the turbulent pipe flow, can also be employed. In the case of stationary or static pipe inlet flow, the flow profile present in the inlet cross section of the pipe is also of rectangular profile.

The material which is to be separated in accordance with the classifying apparatus of the invention in this application is directly supplied onto the porous base and, in order that it be subjected uniformly to the oncoming separating fluid medium, it is uniformly distributed thereon. This can be effected by hand before the beginning of the experimental operation of the classifying apparatus. When the separating column at least is carried by a vibrating device as is known, for example from screw conveyors and test screen machines, and is set into vertical longitudinal vibrations and/or horizontal rotary vibrations, a distribution over the porous base of the material to be sorted or separated is possible also during the classifying operation. This is particularly advantageous if the material to be separated is continuously being supplied during the classifying operation.

It is advantageous in accordance with our invention to provide a vibrating device comprising three leaf springs which are connected to the standpipe and are disposed tangentially and inclined with respect thereto and fastened at one end thereof to the outer wall of the standpipe, and controllable vibrating magnets disposed between the leaf springs. The vibrating magnets can be in the form of electromagnets energized by alternating current. By means of the magnets, the solids on the porous base which is tightly connected to the separating column or standpipe are displaced and uniformly distributed. The swinging or vibrating movements aid in distributing the fine material agglomerates. As has been determined experimentally, the disagglomeration is capable of further improvement when the vibrating magnets are rhythmically or cyclically excited sequentially in accordance with a predetermined program with varying intensities. The displacement of the material on the porous base is thereby further increased. With the heretofore known gravity of free-settling analyzing separators which operate with air as separating medium, the danger arises that the material will deposit within the relatively long separating pipe. It has accordingly been the practice to provide electrical knockers or beaters along the separating pipe and the lower conical constriction, which are supposed to prevent incrustation of the walls of the pipe. The knockers or beaters strike directly against the metallic pipe and produce unpleasant sound which becomes very disturbing over a long period of operation. The aforedescribed vibrating device of the invention sets the base which is fastened to the separating pipe as well as the other parts secured to the separating pipe simultaneously in vibration so that incrustations of the pipe wall are practically completely prevented and moreover noise is reduced to a minimum.

As indicated heretofore, the classifier according to our invention also permits high selectivity or sharp separation of a continuously supplied material-separating flow. This is not possible however with the heretofore conventionally known gravity analyzing separators, because they have a substantially parabolic flow profile and therewith necessarily do not have the degree of sharp separation or selectivity during continuous operation.

In many applications, the continuous analysis and/or preparatory classifying of the material is desired. In accordance with an advantageous embodiment of the classifier of our invention it is possible to provide a central supply tube for the material to be separated having a diameter which is small relative to the diameter of the separating pipe, and which extends downwardly to a level that is slightly spaced from and above the porous base. By means of such a tube, the material which is to be separated is supplied with very low outlet speed into the separating zone. This tube can either extend through the porous base from above or from below into the separating zone. In the case where the tube extends from below into the separating zone, the end thereof is located in the vicinity of the upper surface of the base.

In wet classifying wherein the material which is continuously dispersed in a liquid is supplied to the separating zone, in accordance with a feature of our invention, the material supply tube has a closed end adjacent the porous base and lateral outlet openings are advantageously formed in the tube near the closed end thereof.

If a very large quantity of coarser particulate solids remains behind on the porous base during the continuous separating operation, it can hinder the classifying process. This is prevented in accordance with our invention by removing the coarser particles continuously from the separating zone during the classifying operation. According to an advantageous construction of the classifier of our invention, an annular collecting chamber for coarser material is located at the level of the intermediate porous base on the outer periphery of the separating pipe and communicates with the interior of the separating pipe through at least one relatively short slot formed in the separating pipe directly above the porous base. With the aid of the vibrating device of our invention, the porous base can preferably be vibrated in the direction of the plane in which it is disposed and also perpendicular thereto, whereby the displacement of the coarser material from the center of the base to the discharge slot formed in the separating pipe is advantageously assisted. The displacement is also assisted when, in accordance with another feature of our invention, the porous base is upwardly curved toward the center thereof, i.e. is convex as viewed from above, or is of slightly conical construction. The apparatus and method of our invention are applicable both for gas and liquid separations, and for continuous sorting or decanting.

If, as in accordance with yet another feature of our invention, the conical upper pipe connected to the separating pipe communicates at its upper end directly with a filter for quantitatively precipitating the fine particulate material entrained by the separating medium, the fine particulate component can be determined also without any knowledge of the coarse particulate component by having knowledge of the discharge quantity utilized for analysis. In conventionally known analyzing devices, this is only partly possible. A specific portion of the fine particulate material is always lost so that the fine particles that are extracted are no longer quantitatively available for the subsequent analysis with lower separating limits or splits in the grain size range.

Other features which are considered as characteristic for the invention are set forth in the appended claims.

Although the invention is illustrated and described herein as method and apparatus for classifying by gravity a granular material mixture, it is nevertheless not intended to be limited to the details shown, since various modifications may be made therein without departing from the spirit of the invention and within the scope and range of equivalents of the claims.

Figure 2:
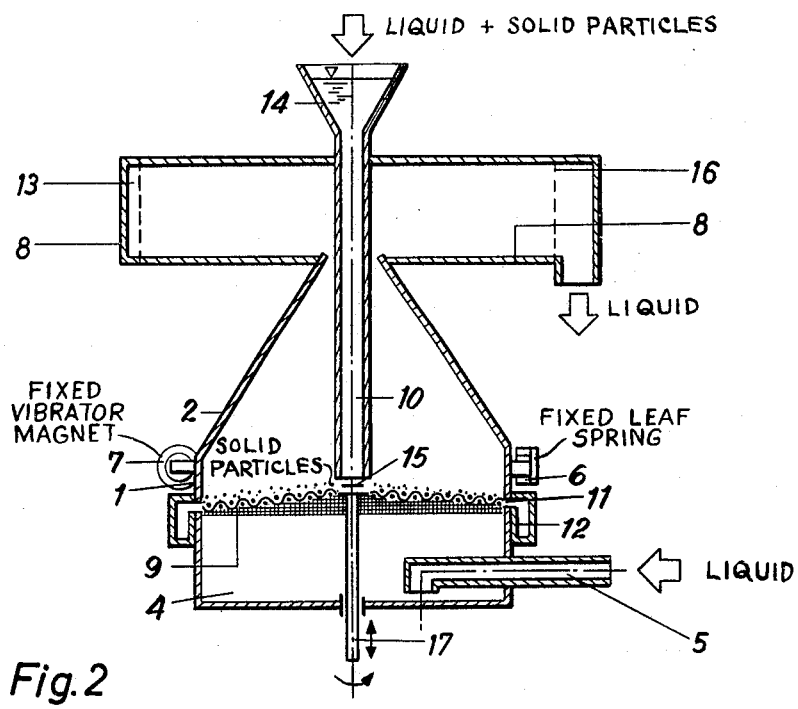

The invention, however, together with additional objects and advantages thereof will be best understood from the following description when read in connection with the accompanying drawings, in which:

FIGS. 1 and 2 are diagrammatic views of two embodiments of the classifying apparatus constructed in accordance with our invention.

Referring now to the drawings and first particularly to FIG. 1 thereof, there is shown a classifier constructed so as to employ air as separating fluid medium. The classifier of FIG. 1 is formed of a short, smooth and circular cylindrical separating pipe or standpipe 1 which is connected at the upper end thereof to a frustoconical pipe 2 narrowing away from the separating pipe 1. The lower end of the separating pipe 1 is closed off by a porous base 3 which consists, for example, of an air- and/or liquid-permeable filtering means such as filter paper, a plastic fiber filter plate, a screen or the like. A closed pan 4 is provided below the porous base 3 and is in communication with a downwardly bent tube 5 through which the separating fluid medium such as air or other gas or vapor flows under superpressure into the pan 4 and is thus able to flow uniformly to the porous base 3. Above the porous base 3 and in the lower portion of the cylindrical separating pipe 1, there is developed a separating zone having a uniform pipe-inlet flow with rectangular profile wherein the separation proper occurs. The flow velocity of the separating fluid medium is increased as the fluid medium travels through the narrowing frustoconical pipe 2 and, in consequence, thereof, the discharge velocity of the fine particles entrained thereby is similarly increased. A continuous reduction of the flow cross section above the separating zone can also be effected for a separating pipe having a constant diameter by providing a cone that extends with its apex downwardly into the separating pipe. It has been determined experimentally, however, that such a cone or similar insert undesirably affects the velocity distribution in the separating zone.

For analysis, a representative test sample of the solid particulate material dispersed for experimentation is placed on the porous base 3, and is displaceable by vibrations produced by the leaf spring system 6 and an AC-energized magnetic coil 7 in the porous base 3 during the classifying operation. The fine particles of the material entrained by the separating fluid medium are quantitatively deposited on a filter medium 16, such as filter paper, for example, of a filtering device 8 into which the frustoconical tube 2 of the classifying apparatus of the invention extends. The separating fluid passes through the filter medium 16 either into the surrounding atmosphere or into a closed channel 13, and from the latter to an outlet opening. The coarse material separated from the fine material remains on the porous base 3 at the termination of the analysis, and can be taken away quantitatively after the removable pan 4 and the porous base 3 are removed.

The classifier shown in FIG. 2 can be operated continuously for a very long period of time and is, above all, suitable for the analysis of solids that are in suspension in liquid. In addition to many similar features present in the embodiment of FIG. 1, the embodiment of FIG. 2 is provided in the center of the separating pipe 1 with a narrow tube 10 having a closed bottom end and lateral outlet openings 15 adjacent the closed end. The solid suspension is continuously supplied through the tube 10 and the openings 15 to the separating zone located at the lower end of the separating pipe 1. The porous base 9 has a slightly conical upper surface so that the coarse granular material, when subjected to vibrating motions, as aforedescribed, slides down the slightly inclined slope of the base 9 to a short slot 11 formed at the lower end of the separating pipe 1 and passes therethrough into an annular collection chamber 12 for the coarse material. As shown in FIG. 1, the fine material can be also retrieved. Outside the filter medium 16, a closed channel 13 is provided through which the separating fluid medium freed of the previously entrained fine material by the filter medium 16 is conducted to an outlet. The tube 10 is provided at its upper end with a funnel 14 through which the material to be classified is added and dispersed in part of the separating liquid medium. The porous base 3 is set in horizontal rotary and vertical vibrations by means of a vertically displaceable and rotary connecting rod 17 passing through a suitably sealed opening provided in the bottom of the pan 4.

The apparatus of our invention is particularly suited for carrying out the method of our invention for the analytic or preparatory separation of a particulate material mixture at a grain size split below about 0.15 mm.

The terms "limits of separation" and "grain size splits"

that are employed throughout the specification may be defined as that size of the particles which has an equal chance of being separated with either the fine or coarse fraction of the material, i.e. 50% of the grain size splits, also known by the terms "classification limit, cut-size point or separation point," will be found in the fine fraction and 50% in the coarse fraction.

We claim:
1. Method of classifying by gravity for the analytic or preparatory separation of a granular material mixture at a grain size split below about 0.15 mm., which comprises supplying a quantity of granular material into a lower portion of a substantially vertically disposed circular cylindrical flow pipe with an axial length-to-diameter rater of less than one so that it is disposed above a flow medium inlet to said flow pipe of given flow cross section, passing a flowing medium into a confined space below the flow medium inlet in a direction away from the inlet, deflecting the flow medium in said space to direct said flow upwardly through said inlet at uniform velocity across said given flow cross section so that a finer component of the granular mixture is entrained by the flowing medium and is separated from a coarser component of the granular mixture remaining in the lower portion of the flow pipe, and drawing off the flow medium together with the entrained finer component at accelerated speed above the flow pipe.

2. Apparatus for classifying by gravity for the analytic or preparatory separation of a granular material mixture at a grain size split below about 0.15 mm. comprising a vertically disposed flow pipe with a constant cross section, said flow pipe being circular cylindrical with an axial length-to-diameter ratio of less than one and having a lower inlet and an upper outlet for flowing medium traversible therethrough, a frustoconical pipe sealingly connected along the perimeter thereof to the perimeter of said flow pipe at the outlet thereof and narrowing away therefrom, a porous base over the cross section of said flow pipe at the inlet thereof, and fluid-introducing means located below said porous base and having an opening directed away from said porous base and surface means disposed adjacent said opening for diverting upwardly through said porous base fluid introduced through said opening and impinging on said surface means.

3. Apparatus according to claim 2 wherein said porous base is a filtering medium.

4. Apparatus according to claim 2, wherein said porous base is a fine-mesh screen.

5. Apparatus according to claim 2, wherein said porous base is curved upwardly toward the center thereof.

6. Apparatus according to claim 2, wherein said porous base is slightly frustoconical, narrowing in an upward direction.

7. Apparatus according to claim 2, including vibrating means for subjecting said flow pipe and said frustoconically narrowing pipe disposed thereabove to at least one of vertical longitudinal oscillations and horizontal rotary oscillations.

8. Apparatus according to claim 7, wherein said vibrating means comprises three leaf springs spaced peripherally about said flow pipe and connected at one end thereof, respectively, to the outer peripheral surface of the flow pipe, said leaf springs extending tangentially and at an inclination to said outer peripheral surface of said flow pipe, and controllable vibrating magnets disposed about said outer peripheral surface of said flow pipe respectively between said leaf springs.

9. Apparatus according to claim 2, including a central supply tube for the material to be separated extending downwardly so that the lower end thereof is slightly spaced from and above said porous base, said supply tube having a relatively small diameter compared to that of the flow pipe.

10. Apparatus according to claim 9, wherein said lower end of said supply tube is closed, and lateral outlet openings are formed in said supply tube adjacent said closed end thereof.

11. Apparatus according to claim 2, including an annular coarse material collection chamber located on the outer periphery of said flow pipe at the level of said porous base, said flow pipe being formed with at least one relatively short slot located above said porous base and providing communication between the interior of said flow pipe and said annular collection chamber.

12. Apparatus according to claim 2, including a filter directly communicating with said frustoconical pipe at the upper end thereof for quantitatively filtering from the flowing medium fine material entrained by the flowing medium.

References Cited

UNITED STATES PATENTS

| | | | |
|---|---|---|---|
| 1,291,137 | 1/1919 | Reed | 209—466 XR |
| 2,586,818 | 2/1952 | Harms | 209—138 XR |
| 2,815,858 | 12/1957 | Rich | 209—138 |
| 3,123,551 | 3/1964 | Walker | 209—139 XR |
| 3,161,483 | 12/1964 | Morris | 209—466 XR |

FOREIGN PATENTS

| | | |
|---|---|---|
| 1,131,650 | 10/1956 | France. |
| 683,938 | 11/1939 | Germany. |
| 969,075 | 4/1958 | Germany. |
| 747,302 | 4/1956 | Great Britain. |
| 881,220 | 11/1961 | Great Britain. |

FRANK W. LUTTER, Primary Examiner

U.S. Cl. X.R.

209—154, 159, 424, 467